United States Patent [19]

Long

[11] Patent Number: 5,270,515
[45] Date of Patent: Dec. 14, 1993

[54] MICROWAVE PLASMA DETOXIFICATION REACTOR AND PROCESS FOR HAZARDOUS WASTES

[76] Inventor: Raymond E. Long, 6207 Craigmont Rd., Catonsville, Md. 21228

[21] Appl. No.: 502,672

[22] Filed: Apr. 2, 1990

[51] Int. Cl.$^5$ .............................................. B23K 9/00
[52] U.S. Cl. ............................ 219/121.4; 219/121.36; 219/10.55 R; 219/121.59; 110/243
[58] Field of Search ............ 219/10.55 F, 10.55 R, 219/10.55 B, 121.43, 121.4, 121.45, 121.59, 121.36; 204/298.39; 156/343, 646, 643; 110/235, 242, 243, 244

[56] References Cited

U.S. PATENT DOCUMENTS

| | | | |
|---|---|---|---|
| 4,909,164 | 3/1990 | Shohet et al. | 110/346 |
| 4,980,092 | 12/1990 | Pineau et al. | 110/346 |
| 5,046,436 | 9/1991 | Fowler | 110/346 |
| 5,062,372 | 11/1991 | Ritter | 110/346 |

FOREIGN PATENT DOCUMENTS

| | | | |
|---|---|---|---|
| 0145807 | 8/1985 | Japan | 110/242 |
| 0046399 | 10/1985 | Japan | 110/346 |

Primary Examiner—Mark H. Paschall
Attorney, Agent, or Firm—Robert E. Bushnell

[57] ABSTRACT

A large volume microwave plasma process for "in-situ" detoxification of dioxins, furans and other toxicants is disclosed. A helical coil and a cylinder of a low loss dielectric tubing is coaxially positioned inside a microwave resonant cavity to extend from a cross-polarized fluid inlet to a cross-polarized vapor outlet. Fluid passing through the coil cylinder and is directly ionized to the plasma state by microwave energy introduced into the cavity. The geometry of the coil relative to the cylinder induces a magnetic field in the plasma to compress the plasma to the center of the cylinder, thereby preventing charring of the cylinder walls. The geometry of coil to cylinder also provides a slower fall through rate for the treatment of liquid and solid waste. The process and apparatus, are particularly suitable for mobile applications that can be moved from site to site, for on-site treatment of hazardous wastes.

47 Claims, 2 Drawing Sheets

1

MICROWAVE PLASMA DETOXIFICATION REACTOR AND PROCESS FOR HAZARDOUS WASTES

BACKGROUND OF THE INVENTION

1. Field Of The Invention

These inventions generally relate to plasma caused by a microwave source, and more particularly, to apparatus and processes for detoxification of hazardous wastes by use of microwave plasma.

2. Description of The Art

A microwave plasma provides rapid "in-situ" detoxification of liquid and gaseous hazardous wastes. This was substantiated by the Lockheed Palo Alto Research Laboratory, as published in DEVELOPMENT OF MICROWAVE PLASMA DETOXIFICATION PROCESS FOR HAZARDOUS WASTE PHASE III, under EPA(SHWRD) Contact No. 68-03-2190 by project officer D. A. Oberacker. The objective of that PHASE III program was to assemble a 15 kilo-Watt microwave plasma (1.45 liter) reactor capable of destroying two to eleven kilo-grams (five to twenty-five pounds per hour) of hazardous wastes, and to determine the destruction efficiencies for various types of waste, i.e., sampling and analysis system to determine trace amounts of any reactants leaving the plasma reactor. Achieved destruction efficiencies were greater than 99.98 to 99.9998 per cent. Efficiency and other than laboratory capacity will depend upon further efforts to improve the reactor design.

Current efforts toward reactor design, albeit for other applications, are represented by Asmussen, et al, U.S. Pat. No. 4,727,293 and Pichot, et al., U.S. Pat. No. 4,745,337, provide a microwave-driven ion generator, but rely upon a plurality of permanent magnets. The elevated temperatures associated with a plasma are not believed to enhance either the performance or longevity of the permanent magnets. Other efforts such as those of Consoli, et al, U.S. Pat. No. 3,774,001, Hull,, et al., U.S. Pat. No. 4,766,351, and Muller, U.S. Pat. No. 4,849,675, rely upon induction heating to generate a plasma.

One earlier effort, by Kirjushin, U.S. Pat. No. 3,577,207 describes a low-temperature plasma generator constructed with a gas-discharge region enclosed in a cylindrical tube symmetrically positioned along an axis of a spherical or cylindrical microwave cavity resonator. The cavity resonator is driven by microwave energy from an equatorially positioned waveguide coupled to the cavity via a plurality of slots in the wall of the cavity, which are equidistantly spaced from the longitudinal axis of the gas discharge tube. Holes in the wall of the cavity through which the gas discharge tube passes are fitted with stubs having diameters less than the critical dimension, to prevent emission of microwave energy to the outside of the cavity, while a turbulent jet of plasma-forming gas is said to keep the plasma from touching the walls of the gas discharge tube. In effect, Kirjushin '207 discloses a plasmatron.

Like Kirjushin '207, other earlier efforts such as Weissfloch, et al., U.S. Pat. No. 3,814,983, and some current efforts such as Mosian, et al., U.S. Pat. No. 4,049,940, Bloyet, et al., U.S. Pat. No. 4,473,736, and Moisan, et al., U.S. Pat. No. 4,810,933, have used cylindrical gas columns or tubes making a single pass through a microwave field as plasma vessels, while other current efforts, such as shown by Sugawara, U.S. Pat. No. 4,735,764, and by Lee, et al., U.S. Pat. No. 4,716,340, use a single chamber driven by a microwave source to create a localized plasma.

SUMMARY OF THE INVENTION

It is therefore, an object of the current invention to provide improved plasma reactors and processes.

It is another object to provide plasma reactors and processes operating at higher frequencies.

It is still another object to provide plasma reactors and processes of increased size and capacity.

It is yet another object to provide plasma reactors and processes operating at higher capacity with shorter wavelengths.

It is still yet another object to provide plasma reactors and processes exhibiting enhanced microwave cut-off.

It is a further object to provide plasma reactors and processes able to counteract centrifugal forces acting upon materials passing through the reactor.

It is a still further object to provide plasma reactors and processes which minimize risk of charring of materials passing through the reactor.

It is also an object to provide plasma reactors and processes exhibiting an increase in microwave power density within the reactor.

These and other objects are achieved with a process and plasma reactor in which a helical coil is arranged to conduct a plasma fluid coaxially wound around a cylindrical container centrally positioned within a spherical cavity. Microwave energy is applied to the cavity via an exciting waveguide, while fluid inlets to the helical coil and cylindrical container, and a vapor outlet from the cylindrical container, are rectangularly formed and oriented perpendicularly to the exciting waveguide. Materials to be subjected to decomposition may be introduced directly into the cylindrical container. Plasma exiting from the helical coil is introduced into the cylindrical container, where nearly instantaneous interaction between the materials and plasma results in extremely rapid decomposition of the materials. A uniform magnetic field, symmetrically arranged around the longitudinal axis of the container, is created by the ionized particles of the plasma passing through the helical coil; the field extends uniformly through the cylinder and repels the ionized particles of the plasma and process materials away from the walls of the container, thereby preventing charring and deposition of materials upon those walls.

BRIEF DESCRIPTION OF THE DRAWINGS

A more complete appreciation of the inventions, and many of the attendant advantages thereof, will be readily enjoyed as the same becomes better understood by reference to the following detailed description when considered in conjunction with the accompanying drawings in which like numbers indicate the same or similar components, wherein.

DETAILED DESCRIPTION OF THE INVENTION

Microwave plasma provides advantages over thermal heating, namely: microwave reaction cavities are simple to construct and are more durable than electrode type plasma reactors; since radiative heat transfer is a function of the fourth power of temperature, a microwave plasma has very intense radiation and is capable of faster heat transfer than a conventional incinerator; microwave plasmas produce high-ion-ionization levels and molecular dissociation without excess heating of reactants; ultraviolet light is given off by microwave plasma and organic process materials are believed to dehydrogenate when excited by ultraviolet light; microwave plasma is not dependent on oxygen for operation while conventional incineration of waste materials require large volumes of excess oxygen for complete combustion; a plasma is a pyrolytic process that has a very short ON/OFF cycle; and a microwave reactor is compact and can be moved from site-to-site by mobile trailer.

Figure 1:
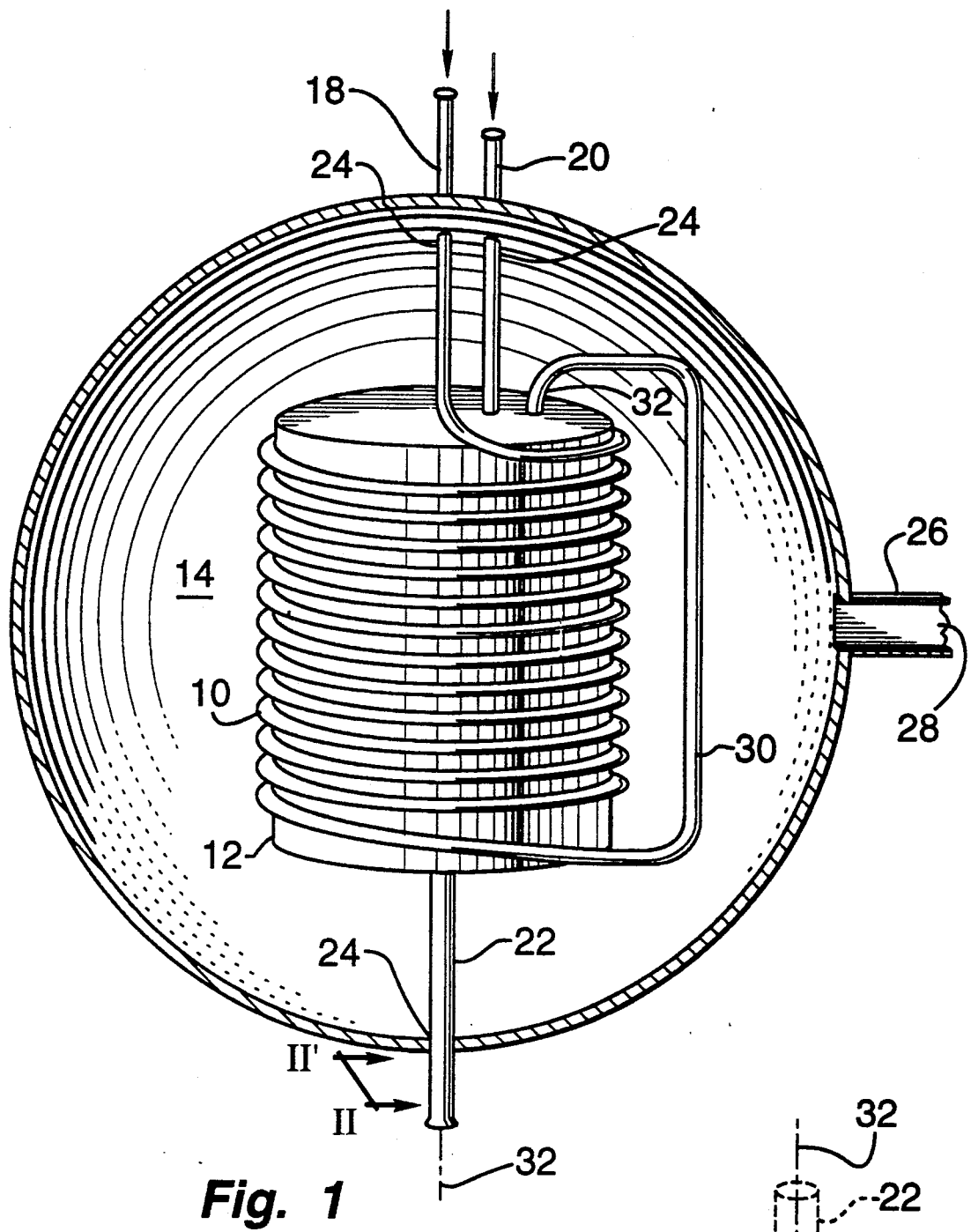
FIG. 1 is a partially cut-away perspective view of one embodiment constructed according to the principles of the disclosed inventions.

Referring now to FIG. 1, tubing is coaxially wound in the form of a helical coil 10 around the exterior of a large volume container such as cylinder 12. The assembly of helical coil 10 and cylinder 12 are centrally positioned within the interior cavity 14 provided by a sphere 16. Preferably, helical coil 10 and cylinder 12 are both made of inert, non-electrically conducting materials, such as quartz, while sphere 16 may be made of stainless steel.

Fluids for a microwave plasma may be introduced into helical tubing 10 via nozzle 18, while a gaseous phase plasma resulting from the interaction of the fluid within tubing 10 with microwave energy as the fluid passes through helical tubing 10, is introduced into quartz cylinder 12, where the plasma and process materials such as toxic wastes, interact to result in a very rapid destruction of the process materials. The process materials may be introduced directly into quartz cylinder 12 via nozzle 20, without contacting the walls of the cylinder, thereby avoiding thermal degradation, such as charring of the process materials. The degraded process materials and plasma exit quartz cylinder 12 via a nozzle 22, which passes through the wall of sphere 16.

Microwave energy is introduced into cavity 14 via waveguide 26 having a rectangular cross-section exhibiting a longitudinal axis 28 aligned along a radius passing through the center of sphere 16. Inert liquid or gaseous phase fluid is introduced into coil 10 via nozzle 18, as with a pump, or under the force of another source of pressure. Molecules of the inert fluid within coil 10 are excited into higher energy states by the microwave energy, thereby converting the fluid into a plasma. The plasma from coil 10 travels along vertical riser 30 and is introduced into cylinder 12 via nozzle 32.

Since the quartz tubing of coil 10 is helically wound around the quartz cylinder 12, a magnetic field will be induced in the plasma within cylinder 12 by the flow of the electrically conducting fluid plasma through helically wound coil 10. Atomic particles in a plasma will normally move in random directions at thousands of miles per second. Since the plasma is formed of all charged particles, it will be affected by a magnetic field. In the configuration of FIG. 1, the atomic particles of the plasma will move in spiral paths through coil 10, each enriching a line of magnetic force to create a uniform magnetic field nearly symmetrically positioned along the longitudinal axis 32 of cylinder 12 and extending into and through cylinder 12. The magnetic field, symmetrically formed around the longitudinal axis 32 of the cylinder, is created by the ionized particles of the plasma passing through the helical coil 10; the field extends uniformly through the cylinder and repels the ionized particles of the plasma and process materials away from the walls of the cylinder, thereby preventing charring and deposition of materials upon those walls. Positively charged particles spiral in one direction, negative particles in the opposite direction; unless the particles collide, they will not move across magnetic lines of force and therefore can not easily reach the walls of the quartz cylinder to lose energy and cause charring.

The magnitude of the induced electromotive force (E) is proportional to the flux density (B), the length of the conductor (l) in the magnetic field, and the flow rate (v), $$E = B \cdot l \cdot v \tag{1}$$

Consequently, for a cylinder with three feet between opposite bases i.e., $l \approx 3$ feet, a flux density of 543 Tesla, and a velocity of five meters per second, E=4.6. Then with a voltage of 2500 volts, and a current of 20 amperes, 2500/4.6=543 Tesla of flux density is created. At a frequency of 2.45 giga-Hertz, this flux density is well above the 895 gauss needed for electronic cyclotronic resonance.

The energy of any system is determined by its frequency, i.e., $$E = \lambda V \tag{2}$$

where
$\lambda$ is Planck's constant, and
V is frequency.

Figure 2:
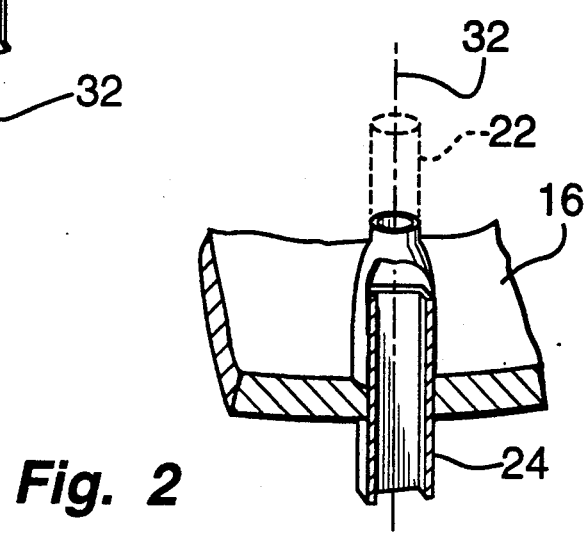
FIG. 2 is a partially cut-away perspective view of a detail of an alternative embodiment.

Therefore, it may be desirable that the microwave frequency be set at 2.45 giga-Hertz or higher. The microwave power cavity 14 is redesigned so that the geometry of cavity 14 enables containment of a large volume quartz cylinder 12 and tubing 10, as shown in FIG. 1, with the quartz tubing helically wound around the quartz cylinder 12 being a reactor container 12. The volume of the quartz cylinder 12 can be increased to 119 liters, and larger, simply by placing the quartz tubing inside a larger quartz cylinder. This can be accomplished without risk of microwave radiation leaking out of sphere 16. If, as is shown in FIG. 2, the fluid inlets and vapor outlet are made rectangular in dimension along their respective sections traversing sphere 16, that is, for outlet 22 shown with phantom lines, along the length of section 24, and are perpendicular to the exciting waveguide 26, they will be cross-polarized to the exciting waveguide. Section 24 has a longitudinal axis 32 aligned along a radius of sphere 16, perpendicular to axis 28. Furthermore, the inlets and outlets can have the same dimensions as the exciting waveguide 26. In effect, the voltage vector of the $TE_{11}$ wave mode of the microwave energy inside cavity 14 sees the width of the inlet and outlet openings as the narrow dimension of the rectangular exciting waveguide, and because the microwave energy has a cutoff wavelength much shorter than the exciting wavelength, the inlet and outlet openings do not exist for the exciting signal entering from waveguide 26.

Radiation leakage can also be prevented by the use of a non-conductive and microwave absorbing silicon carbide coating on the inlet and outlet openings 24 passing into cavity 14, as is mentioned in my earlier U.S. Pat. No. 3,816,689.

Figure 3:
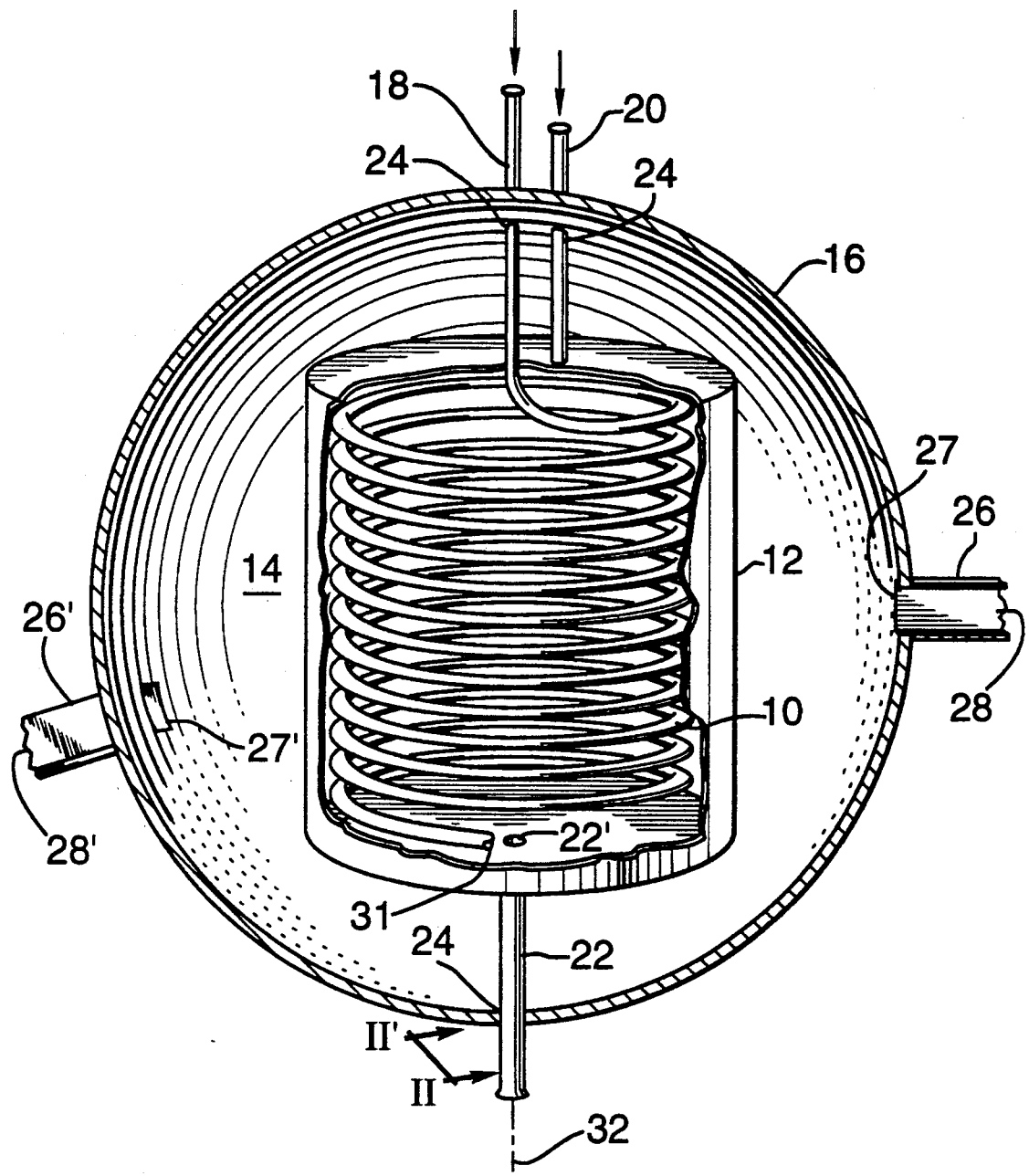
FIG. 3 is a partially cut-away perspective view of another embodiment constructed according to the principles of the disclosed inventions.

Referring now to FIG. 3, an alternative embodiment constructed according to the principles disclosed herein, is illustrated. Quartz tubing is coaxially wound in the form of a helical coil 10 around the interior cavity of a reactor vessel provided by a large volume container such as right circular cylinder 12, coaxially with the longitudinal axis 32 of cylinder 12, where axis 32 passes through the center of sphere 16. The assembly of helical coil 10 and cylinder 12 are centrally positioned within the interior cavity 14 of sphere 16. Preferably, helical coil 10 and cylinder 12 are both made of inert, non-electrically conducting materials, such as quartz, while sphere 16 may be made of stainless steel.

Fluids for the microwave plasma may be introduced into helical tubing 10 via nozzle 18 passing through the wall of sphere 16 and the wall of cylinder 12. Gaseous phase plasma resulting from the fluid passing through helical tubing 10 exits from the tubing via nozzle 31 within the interior of cylinder 12, where the plasma and process materials interact to result in destruction of the process materials. The process materials may be introduced directly into quartz cylinder 12 via nozzle 20, which passes through the walls of sphere 16 and cylinder 12, without contacting the walls of the cylinder. The degraded process materials and plasma exit quartz cylinder 12 via orifice 22' and nozzle 22, which passes through the wall of sphere 16. Microwave energy is introduced into cavity 14 via all, or any one of a plurality of waveguides 26, 26' having rectangular cross-sections exhibiting longitudinal axes 28, 28' aligned along radii passing through the center of sphere 16.

Preferably, reaction vessel 16 is made of stainless steel. A silver, or preferably gold, layer covering the interior wall of vessel 16 will advantageously reflect ultraviolet light given off by the plasma back to the center of the vessel, thereby allowing the reflected ultraviolet light to contribute to the decomposition of the process materials within the chamber of cylinder 12.

Since the quartz tubing is helically wound coaxially along the longitudinal axis 32 of right circular cylinder 12, a magnetic field is induced within the plasma inside cylinder 12 by the flow of the electrically conducting fluid plasma passing through helically wound quartz tubing 10.

The microwave power density is defined as the amount of microwave power absorbed per liter of plasma fluid entering the reactor. The design of the power cavity is such that the dimensions of the quartz reactor vessel 12 i.e., length and diameter of the cylindrical container shown are of no consequence as far as the microwave power density is concerned. Varying the volume of the plasma fluid changes the microwave power density. If the quartz reactor in the power cavity has a pressure of 50 to 60 Torr with two liters of plasma fluid in the reactor, the power density will be, $$50 \text{ kilo-Watts}/2 \text{ liters} = 25 \text{ kilowatts per liter.} \quad (3)$$

Therefore, the amount of power absorbed per unit volume of plasma in kilo-watts per liter is variable by the amount of fluid in the reactor. A spherical power cavity will concentrate all of the microwave radiation at the center of the cavity. The focal length for a spherical surface is, $$f = R/2. \quad (4)$$

As is shown in FIG. 1, the microwave power cavity is preferably constructed as a spherical design. It receives microwave power for the supply via waveguide 26 and concentrates the power into the plasma fluid maintained in a 4.5 centimeter outside diameter quartz tube 3,064.2 centimeters long that is introduced into a 40.64 centimeters by 91.44 centimeter quartz cylinder, both tubing and cylinder receive large concentrations of microwave radiation. The power density provided by the design can be increased without reduction in residence time for the toxicant process materials.

To initiate a plasma, two liters of a gaseous or liquid phase fluid, preferably of an inert substance such as argon, is introduced into the helically wound tubing 10 via inlet 18, where microwave radiation is applied continuously (cw). Under a pressure of 50 Torr, the electric and magnetic microwave fields excite the Argon electrons to high kinetic energies. After plasma conditions are stable, the flow rate can be regulated to approximately five meters per second. The resulting plasma exits from tubing 10 and is introduced into the interior of the reactor vessel provided by container 12 via nozzle 31 formed at the distal end of tubing 10. The process materials such as toxicants, are introduced into interior of the reactor vessel 12, where the process materials are quickly mixed with gaseous phase plasma from the feed system at a rate of 0.2 mole per second. Liquid toxicants are dispensed into reactor vessel 12 from a reservoir by the use of a displacement pump with anti-backing valve so that leakage of liquids due to vacuum can be eliminated. Effluent products will be channeled from reactor vessel 12 via drain 22' and nozzle 22 to a scrubber (not shown) where any inorganic materials are recovered. Organic process materials may be passed to an on-line analytical system with a flare.

In a microwave plasma the rate of ablation or reaction is the change in concentration of a reactant being processed per unit time in a plasma. The resident time of a toxicant in the plasma controls the reactivity of the process. For a gas toxicant, the time would be calculated:

$$t = [273 \cdot P \cdot V] \div [101{,}000 \cdot F \cdot T], \quad (5)$$
$$= 0.00270[P \cdot V] \div [F \cdot T] \quad (6)$$

where:
t = time in seconds,
P = absolute pressure in Pascals (Pa),
V = volume of plasma in liters,
F = flow rate of gas (standard liters per second),
T = absolute temperature of gas, in degrees Kelvin (°K)

Therefore, with a feed rate of 0.2 moles per second = 4.48 standard liters per second, $$t = [273 \cdot 6 \cdot 10^3 \cdot 119] \div [101{,}000 \cdot 4.5 \cdot 2 \cdot 10^3] \quad (7)$$
$$= [1.95 \times 10^8] \div [909 \times 10^6] \quad (8)$$
$$= .0021452 \times 10^2 = 0.214 \text{ seconds.} \quad (9)$$

When temperature in the plasma is 2000° K., and pressure in the plasma is 6000 Pascals, at a volume of 119 liters, the residence time for a gas toxicant is:

$$t = [0.00270 \cdot 6 \cdot 10^3 \cdot 119] \div [4.5 \cdot 2 \cdot 10^3], \text{ or} \quad (10)$$

$$t = 1.95 \cdot 10^8 \div 9.1 \cdot 10^6 = 0.214 \text{ seconds.} \quad (11)$$

Empirically, two tenths of a second is more than sufficient time for ablation of gas toxicants. The reactions occur so rapidly because the embodiments disclosed enable direct coupling of the microwave energy into the reacting gases via free electrons in the plasma.

For the treatment of liquid or solid waste, an alternative use of the helical tubing is causing a slower fall through. This is due to the gravitational constant 9.81 meters per second$^2$. The liquid or solid waste would fall through at such a rate that it would not have time for complete ablation. By introducing the liquid or solids directly into the helical tubing, a gravitational advantage is attained, which may be calculated by:

$$GA = l/H \qquad (12)$$

$$l = 16 \text{ turns} \cdot 40.64 \text{ centimeter} \qquad (13)$$
$$= 650.24 \text{ centimeter} = 6.50 \text{ meter}. \qquad (14)$$

where l is the length of tubing in the helical coil. If the height (H) of the helical coil is set at 0.91 meters, then, $$6.5 \text{ meter} \div 0.91 \text{ meter} = 7.143 \text{ advantage}. \qquad (15)$$

Thus, the time to fall in a vertical reactor is calculated by:

$$t = [2L/a]^{\frac{1}{2}}. \qquad (16)$$

Where:
t = residence time in seconds,
l = length of helical tubing in meters, and
a = gravitational constant (9.81 meters per second$^2$).
Now, due to the GA = 7.143 meters, the new gravitational rate is, $$9.81 \text{ meters per second}^2 \div 7.143 = 1.37 \text{ m/sec}^2. \qquad (17)$$

Since, $$t = [6.5 m \cdot 2] \div 1.37 m/sec^2]^{\frac{1}{2}} \approx 3.09 \text{ seconds}. \qquad (18)$$

Empirically, 3.09 seconds is sufficient time for complete ablation of a liquid or solid toxicant process solids.

The term microwave plasma as used herein refers to a fluid substance produced by a microwave electromagnetic field where the resultant plasma is electrically neutral and has an equal number of positive ions and negative electrons. A microwave plasma generator can be operated with a number of different fluids in various atomic states, that is, plasma formed of the inert and monatomic fluids such as Hg, Ar, Ne, He, also, the diatomic fluids such as $H_2$, CO, $N_2$, and $O_2$, as well as, the triatomic fluids such as $N_2O$, $SO_2$, $CS_2$, $CO_2$ and other polyatomic fluids such as $NH_3$, $C_2H_6$, $Al(BH_4)_3$ and air. The selection of the plasma fluid will depend on the chemical reaction that is desired and the operating conditions required, i.e., aluminum borohydride can be used to propel a rocket. Other applications include a plasma torch for welding and the reduction of organic and inorganic fractions. The apparatus can be used as an ion-drive rocket for a space vehicle.

A microwave plasma generator of this design can utilize microwave fields to accelerate positively charged ions and negative electrons which can be ejected through a cylinder with a nozzle for ejection. Very high ejection velocities can be attained without giving rise to difficulties associated with high temperatures at the exhaust. Consequently, velocities within the range of 200 to 300 kilometers per second can be attained without the use of a cathode and anode. The microwave plasma generator can also be used in chemical studies and chemical translations that require high kinetic energies.

If sea water was introduced into the cylindrical container 12 surrounded by helical tubing coil 10 introducing a plasma into container 12, a microwave field applied to cavity 14 via a plurality of waveguides 26, 26', would induce an electric current through the sea water. The magnetic field created by plasma passing through helical coil 10 would result in an electromagnetic force on the sea water which would drive the sea water as a jet propulsion sufficient to propel a sea going vessel.

Various modifications and alterations may be made to the embodiments disclosed without departing from the principles of the current invention, and applications other than those disclosed here may be pursued in the practice of the principles disclosed. By way of example, although a sphere gives the best reflection back to the center of its interior hollow, the reactor vessel may be constructed in another geometric shape such as a hollow rectangular cylindrical container.

I claim:
1. A microwave reactor, comprising:
    a sphere providing a hollow interior cavity;
    a microwave waveguide extending radially outwardly from said sphere, along a first radial axis of said sphere;
    a closed container made of an inert, non-electrically conducting material, said container being centrally disposed within said cavity and exhibiting a longitudinal axis passing through a centroid of said sphere, and having first and second inlets, and an outlet, said first inlet and outlet extending through said sphere; and
    a hollow helical coil made of an inert, non-electrically conducting material, wound around an exterior circumferential surface of said container coaxially with said longitudinal axis, with a first end of said coil coupled to said first inlet and a second end of said coil extending through said sphere.

2. A microwave reactor, comprising:
    a first container providing a hollow interior cavity;
    means extending radially outwardly from and along a first axis passing through a centroid of said first container, for coupling microwave energy into said hollow interior cavity;
    a closed second container centrally disposed within said hollow interior cavity and exhibiting a longitudinal axis passing through said centroid, said closed second container comprising an inert non-electrically conducting material, a first inlet for providing a plasma fluid, a second inlet for providing a process material, and an outlet; and
    means for conducting the plasma fluid through the first container, through a microwave permeable, dielectric helical coil wound coaxially around the closed second container along said longitudinal axis, through the first inlet, and into an interior of the closed second container, said plasma fluid being converted into a microwave plasma in the helical coil by the microwave energy in the conducting means, said microwave plasma decomposing the process material into a resulting fluid for withdrawal from the closed second container via the outlet.

3. The microwave reactor of claim 2, further comprised of said longitudinal axis being oriented perpendicular to said first axis.

4. The microwave reactor of claim 2, further comprised of said means extending radially outwardly being oriented perpendicularly to said first inlet, said second inlet and said outlet.

5. The microwave reactor of claim 2, wherein said means extending radially outwardly, said first inlet, said second inlet, and said outlet each comprise a rectangular cross-section, said means extending radially outwardly further comprising being cross-polarized relative to said first inlet, said second inlet, and said outlet.

6. The microwave reactor of claim 3, wherein said means extending radially outwardly, said first inlet, said second inlet, and said outlet each comprise a rectangular cross-section, said means extending radially outwardly further comprising being oriented perpendicularly to said first inlet, said second inlet, and said outlet.

7. The microwave reactor of claim 2, wherein,
said first container comprises one of a first sphere and a first cylinder,
said closed second container comprises a second cylinder, and
said conducting means comprises the helical coil being positioned along a focal length of the closed second container.

8. A process for decomposing a waste fluid, comprising the steps of:
introducing a plasma fluid into an interior cavity of a hollow container and causing the plasma fluid to pass through a microwave permeable, dielectric helical spiral along a path extending coaxially around a closed container centrally positioned within said interior cavity;
introducing the waste fluid into said closed container;
applying microwave energy to said interior cavity while said first plasma fluid passes through said helical spiral, converting said plasma fluid into a microwave plasma;
passing said microwave plasma from said path into said closed container with said waste fluid to produce a decomposed fluid; and
withdrawing said decomposed fluid from said closed container.

9. The process of claim 8, wherein,
said hollow container comprises one of a sphere and a first cylinder,
said closed container comprises a second cylinder, and
said helical coil is positioned along a focal length of the closed container.

10. A microwave reactor for decomposition of a chemical compound, comprising:
a first container providing a hollow interior cavity;
means extending radially outwardly from and along a first axis passing through a centroid of said first container, for coupling microwave energy into said hollow interior cavity;
a closed second container centrally disposed within said hollow interior cavity and exhibiting a longitudinal axis passing through said centroid, said closed second container comprising an inert non-electrically conducting material, a first inlet connected to a microwave permeable, dielectric helical coil, a second inlet for providing the chemical compound, and an outlet; and
means for transporting a plasma fluid from an exterior of the first container through the helical coil, wound coaxially around the closed second container along said longitudinal axis, said plasma fluid being converted by the microwave energy in the helical coil into microwave plasma decomposing the chemical compound for removal from the second closed container via the outlet.

11. The microwave reactor of claim 10, further comprised of said first inlet and said outlet comprising:
openings being larger than a predetermined microwave cut-off wavelength corresponding to a predetermined frequency, said first inlet and said outlet being crosspolarized to a waveguide microwave source and being coated with a microwave energy absorption means for preventing escape of said microwave energy by absorbing said microwave energy.

12. The microwave reactor of claim 10, wherein said transporting means comprises self-generating plasma reflection means for reflecting ionized particles of said chemical compound away from walls of the closed second container by producing a magnetic field extending uniformly throughout the second container and created by the ionized particles of the microwave plasma passing through the helical coil.

13. The microwave reactor of claim 10, wherein said transporting means comprises reflux means for exposing said microwave plasma to said microwave energy numerous times in response to a number of turns of the helical coil.

14. The microwave reactor of claim 10, wherein said transporting means comprises retardation means for retarding flow of said microwave plasma in response to said conversion of said plasma fluid into said microwave plasma.

15. The microwave reactor of claim 10 wherein said transporting means comprises a convoluted relationship with the closed second container.

16. The microwave reactor of claim 10, wherein said transporting means comprises a labyrinthian relationship with said closed second container.

17. The microwave reactor of claim 10, wherein,
said first container comprises one of a sphere and a first cylinder,
said closed second container comprises a second cylinder, and
said transporting means comprises the helical coil being positioned along a focal length of the closed second container.

18. A process for decomposing a process fluid, comprising the steps of:
introducing an inert fluid into an interior cavity of a hollow container;
causing the inert fluid to enter a closed container positioned within said interior cavity by passing through a helical spiral along a path extending around an axis of the closed container;
introducing said process fluid into said closed container;
converting said inert fluid into a microwave plasma by applying microwave energy to said interior cavity while said inert fluid passes along the path;
decomposing said process fluid by passing said microwave plasma from said path into said closed container; and withdrawing said decomposed fluid from said closed container.

19. The process of claim 18 wherein said closed container is centrally positioned within said interior cavity.

20. The process of claim 18, further comprising the step of concentrating said microwave energy at a center of the hollow container by making said hollow container spherical.

21. The process of claim 18, wherein said helical spiral and said closed container are made of an inert, non-electrically conducting material.

22. The process of claim 18, wherein said helical spiral and said closed container are made of quartz.

23. The process of claim 18, wherein said hollow container is made of stainless steel.

24. The process of claim 23, further comprising the step of reflecting ultraviolet light of the microwave plasma, said ultraviolet light decomposing said process fluids, by coating interior walls of said hollow container with one of gold and silver.

25. The process of claim 18, further comprising the step of inducing a magnetic field in the microwave plasma within the closed container by said passing of the inert fluid through the helical spiral, said magnetic field repelling ionized particles of both the microwave plasma and the process fluid away from walls of the closed container, said repelling preventing charring and deposition of said particles and other materials on the walls.

26. The process of claim 18, further comprising the step of cross-polarizing an inlet and an outlet of said hollow container by constructing said inlet and said outlet being rectangular in dimension at sections traversing said hollow container.

27. The process of claim 18, wherein said microwave energy is applied to said interior cavity from a waveguide having a longitudinal axis passing through a center of the hollow container.

28. The process of claim 27, wherein said waveguide comprises a rectangular cross-section at a section traversing the hollow container.

29. The process of claim 18, further comprising the step of preventing radiation leakage by coating an inlet opening and an outlet opening of the hollow container with a non-conductive, microwave absorbing substance.

30. The process of claim 29, wherein said microwave absorbing substance is silicon carbide.

31. The process of claim 18, wherein the steps of introducing an inert fluid, causing the inert fluid, and introducing said process fluid are replaced with the step of introducing both an inert fluid and the process fluid into a closed container in an interior cavity of a hollow container by passing said inert fluid and said process fluid through a helical spiral along a path extending around an axis of the closed container positioned within said interior cavity for allowing complete ablation of the process fluid by retarding fall-through of the process fluid.

32. The process of claim 18, further comprising the steps of: accelerating positive ions and electrons of the microwave energy; and ejecting said accelerated positive ions and electrons from the hollow container through an ejection nozzle.

33. The process of claim 18, wherein said withdrawing step is replaced by the steps of: creating an electromagnetic force on the decomposed process fluid; and ejecting said decomposed process fluid as a propellant.

34. The process of claim 18, wherein the causing step is replaced with the step of causing the inert fluid to enter a closed container positioned within said interior cavity by passing through a helical spiral along a path extending around an axis of the closed container from an upper section to a lower section of the closed container and through a vertical riser.

35. A microwave reactor for decomposing a process fluid, comprising:
   means for introducing an inert fluid into a closed container in an interior cavity of a hollow container by causing the inert fluid to pass through a path including a helical spiral extending around an axis of the closed container positioned within said interior cavity;
   means for providing the process fluid into the closed container;
   means for converting said inert fluid into a microwave plasma by applying microwave energy to said interior cavity while said inert fluid passes through the path;
   means for decomposing said process fluid in the closed container by passing said microwave plasma from said path into said closed container with said process fluid; and
   means for withdrawing said decomposed fluid from said closed container,
   wherein said passing of the inert fluid through the helical spiral induces a magnetic field in the microwave plasma for repelling ionized particles of both the microwave plasma and the process fluid away from walls of the closed container, said repelling preventing charring and deposition of said particles and other materials on the walls.

36. The microwave reactor of claim 35 wherein said closed container is centrally positioned within said interior cavity.

37. The microwave reactor of claim 35, wherein said hollow container is spherical for concentrating said microwave energy at a center of the hollow container.

38. The microwave reactor of claim 35, wherein said helical spiral and said closed container are made of an inert, non-electrically conducting material.

39. The microwave reactor of claim 35, wherein said helical spiral and said closed container are made of quartz.

40. The microwave reactor of claim 35, wherein said hollow container is made of stainless steel.

41. The microwave reactor of claim 35, wherein interior walls of said hollow container are one of gold-coated and silver-coated for reflecting ultraviolet light of the microwave plasma, said ultraviolet light decomposing said process fluids.

42. The microwave reactor of claim 35, further comprising an inlet and an outlet having rectangular sections traversing said hollow container for cross-polarizing.

43. The microwave reactor of claim 35, further comprising a waveguide having a longitudinal axis passing through a center of the hollow container for applying said microwave energy to said interior cavity.

44. The microwave reactor of claim 43, wherein said waveguide comprises a rectangular cross-section at a section traversing the hollow container.

45. The microwave reactor of claim 35, further comprising an ejection nozzle for ejecting accelerated positive ions and electrons of the microwave energy from the hollow container.

46. The microwave reactor of claim 35, wherein said introducing means is replaced with means for introducing an inert fluid into a closed container in an interior cavity of a hollow container by causing the inert fluid to pass through a path including: a helical spiral extending around an axis of the closed container positioned within said interior cavity; and a vertical riser.

47. The microwave reactor of claim 35, wherein said introducing means and said providing means are replaced by means for introducing both an inert fluid and the process fluid into a closed container in an interior cavity of a hollow container by causing the inert fluid and the process fluid to pass through a path including a helical spiral extending around an axis of the closed container positioned within said interior cavity.

* * * * *